United States Patent [19]

Tao et al.

[11] 4,122,009
[45] Oct. 24, 1978

[54] METHOD OF RESOLVING A MIXTURE OF OIL, WATER, AND SOLIDS

[75] Inventors: Fan-sheng Tao, Morro Bay, Calif.; John E. Warner, Houston, Tex.

[73] Assignee: Texaco Inc., New York, N.Y.

[21] Appl. No.: 827,915

[22] Filed: Aug. 26, 1977

Related U.S. Application Data

[63] Continuation-in-part of Ser. No. 710,075, Jul. 30, 1976, abandoned.

[51] Int. Cl.² .............................................. B01D 21/02
[52] U.S. Cl. ........................................................ 210/84
[58] Field of Search ................... 210/83, 84, 513, 519, 210/521

[56] References Cited

U.S. PATENT DOCUMENTS

| | | | |
|---|---|---|---|
| 1,869,758 | 8/1932 | Lungstras | 210/521 |
| 2,056,763 | 10/1936 | Bays | 210/47 |
| 2,261,101 | 10/1941 | Erwin | 210/84 X |
| 3,703,467 | 11/1972 | Lummus et al. | 210/522 |
| 3,992,297 | 11/1976 | Baughcom et al. | 210/519 X |

FOREIGN PATENT DOCUMENTS 24,417  10/1883  Fed. Rep. of Germany ............ 210/84

*Primary Examiner*—William A. Cuchlinski, Jr.
*Attorney, Agent, or Firm*—Carl G. Ries; Thomas H. Whaley; Theron H. Nichols

[57] ABSTRACT

A method for resolving a mixture of oil, water and solids including flowing the mixture under and over two forwardly inclined baffles for settling out the solids and for causing oil drops to rise, collect, and flow in V-shaped grooves in the under side of the two baffles for coalescing the drops of oil into larger globs. The final steps of flowing the mixture over the upper forwardly declining baffle left all coalesced oil on the surface for being drawn off as solids-free and water-free oil, and draw off water between the oil outlet and the solids outlet for producing oil-free and solids-free water.

12 Claims, 4 Drawing Figures

METHOD OF RESOLVING A MIXTURE OF OIL, WATER, AND SOLIDS

BACKGROUND OF THE INVENTION

This is a Continuation-in-Part of application Ser. No. 710,075, filed July 30, 1976, now abandoned.

In oil fields particularly, better methods are needed to separate oil from produced brines and water. Environmental considerations require the the oil content of the produced water be reduced to an acceptable level, no more then 150–200 ppm (parts per million) of oil in the water discharged into rivers or streams nearby. Likewise, clean water is most important for reinjecting into wells for secondary recovery.

The conventional system comprises the utilization of a stripper tank or separator for passing the produced fluid therethrough for separation of oil from water. This fluid may include oil, water, and an emulsion of the two. This separator may use chemicals and/or heat to separate the oil and water from the oil-water emulsions. This water usually has an oil content of about 400 ppm of oil in the water.

Because this water contains about 400 ppm of oil, it is too polluted to dump into any streams or rivers, it has too much oil in it to use in an injection well for water flooding, and thus it must be stored or treated further.

A feature of this invention is the great savings resulting by providing a new settling tank that produces a cleaner water for injecting into injection wells.

The recovered oil soon pays for the cost of the settling tank:

---

400-ppm oil in inlet water to settling tank
−150-ppm oil in output water from settling tank
250-ppm oil removed and recovered
10,500 BPD (barrels per day) water through the settling tank.
$\frac{10,500 \times 250}{1,000,000} = 2.625$ BPD oil recovered from settling tank.
$14.00 - a typical purchase price per barrel for foreign oil.
Savings 1 year = 2.6 × 365 = 949 barrels per year × $14.00 = $13,286.00

---

Likewise, the cleaner water will pass more freely through the formation sands to more easily displace oil towards the producing wells. It is shown below what the savings would be by just extending the life by one year of each of 80 oil wells feeding their waste water to the new settling tank. Obviously, more than one year extension of life would likely occur in the wells when considering that the average life of a well may be 20 years before secondary recovery, as by water flooding is initiated, as when the well production reaches a low of below 5 BPD, for example.

This average is difficult to calculate, as for example, production started in one field of oil wells at Sour Lake, Texas, in January 1903, and the wells were still producing nearly 1,600 barrels per day at the end of 1976.

The savings for each year extension of life of the wells due to using this new method for resolving the mixture of oil, solids, and water would be:

80 × 5 × 365 = 146,000 bbl/oil × $14.00 = $2,044,000.00

In addition, this new method utilizes a compact and space saving settling tank which is very attractive economically where space is expensive such as on an offshore platform.

OBJECTS OF THE INVENTION

A primary object of this invention is to provide a new method for resolving a mixture of oil, water, and solids from an oil and solids-in-water influent.

Another object of this invention is to provide a new method for resolving a mixture of oil, water, and solids by utilizing a settling tank having at least two declined baffles with a clean water discharge intermediate the level of the two ends of the top declined baffle.

A further object of this invention is to provide a method for resolving a mixture of oil, water, and solids by using a cylindrical settling tank that has a baffle support system that is simple, economical, and easy to assemble.

A still further object of this invention is to provide a method for resolving a mixture of oil, water, and solids by utilizing a cylindrical settling tank that has a drain for discharge of solids that have collected at one end of an upper inclined baffle fixed to one side of the tank wall, an oil outlet at the surface of the fluid in the tank, and a clean water outlet between the oil outlet and the solids outlet.

A further object of this invention is to provide a method for resolving a mixture of oil, water, and solids by using a settling tank for removing oil and solids from an oil and solids-in-water influent that is easy to operate, is of simple configuration, is economical to build and assemble, and is of greater efficiency for the collection of oil and solids from a water mixture.

Other objects and various advantages of the disclosed method for resolving a mixture of oil, water, and solids will be apparent from the following detailed description, together with the accompanying drawings, submitted for purposes of illustration only and not intended to define the scope of the invention, reference being made for that purpose to the subjoined claims.

BRIEF DESCRIPTION OF THE DRAWINGS

The drawings diagrammatically illustrate by way of example, not by way of limitation, one form or mechanism or a typical settling tank utilized by the disclosed method of the invention wherein like reference numerals have been employed to indicate similar parts in the several views in which:

FIG. 4 is an enlarged schematic right side view of a settling tank showing dimensions of a typical settling tank utilized by the new method.

The invention disclosed herein, the scope of which being defined in the appended claims, is not limited in its application to the details of construction and arrangement of parts shown and described that could be utilized by the disclosed methods, since the invention is capable of using other embodiments made by other methods and of being practiced or carried out in various other ways. Also, it is to be understood that the phraseology or terminology employed herein is for the purpose of description and not of limitation. Further, many modifications and variations of the invention as hereinbefore set forth will occur to those skilled in the art. Therefore, all such modifications and variations which are within the spirit and scope of the invention herein are included and only such limitations should be imposed as are indicated in the appended claims.

DESCRIPTION OF THE INVENTION METHOD OF RESOLVING A MIXTURE OF OIL, WATER, AND SOLIDS

Figure 2:
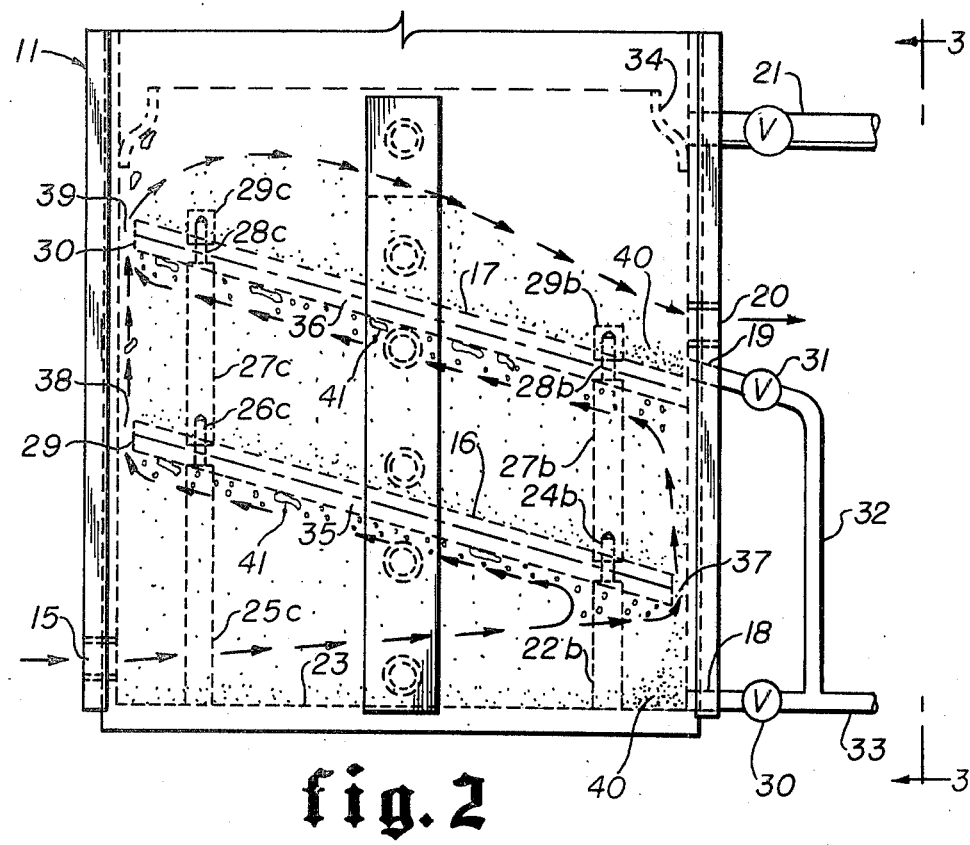
FIG. 2 is a schematic right side view of the disclosed settling tank with parts in section for clarity of disclosure.

The disclosed method for resolving a mixture of oil, water, and solids comprise the following method steps:

(1) injecting the mixture of oil, solids, and water into an inlet 15 in the lower back side of a tank 11, FIG. 2, (2) flowing the mixture under a lower baffle 16 declined forwardly for coalescing drops of oil that have separated from the mixture into larger globs 41 under the declined baffle for flowing rearwardly under the baffle, (3) flowing the mixture up through an opening 37 in the lower end of the lower declined baffle 16 and then back rearwardly under an upper forwardly declined baffle 17, which vertically arranged baffles form lower, intermediate, and upper compartments, (4) collecting the solids 40 on the bottom 23 of the bank 11 that have settled out of the mixture as it flows under and over the lower baffle 16, (5) flowing the mixture up through an opening 38 in the upper end of the upper baffle 17 and then forwardly over the upper forwardly declined baffle 17, (6) collecting the silids 40 on the upper baffle 17 as the mixture flows over the upper baffle, (7) drawing off the oil from a surface outlet 21 that has coalesced as water-free and solids-free oil, and (8) drawing off the water from between the upper solids outlet 19 and the oil outlet as oil-free and solids-free water.

More details of step (2) comprise, (2) flowing and guiding the oil droplets that have separated from the mixture in the lower compartment rearwardly and upwardly in V-shaped grooves 35 in the under surface of the lower declined baffle 16 to coalesce into larger globs of oil 41 for passing upwardly from the lower compartment to the intermediate compartment.

More details of step (3) comprise, (3) flowing and guiding the oil droplets that have separated from the mixture in the intermediate compartment rearwardly and upwardly in V-shaped grooves 36 in the under surface of the upper declined baffle 17 to coalesce into larger globs 41 of oil for passing upwardly from the intermediate compartment to the upper compartment surface for draw off as water-free and solids-free oil.

DESCRIPTION OF THE SETTLING TANK

While various devices may be utilized for carrying out or practicing the inventive methods above, FIGS. 1-4 illustrate at least one inventive apparatus for practicing the methods described hereinafter.

Figure 1:
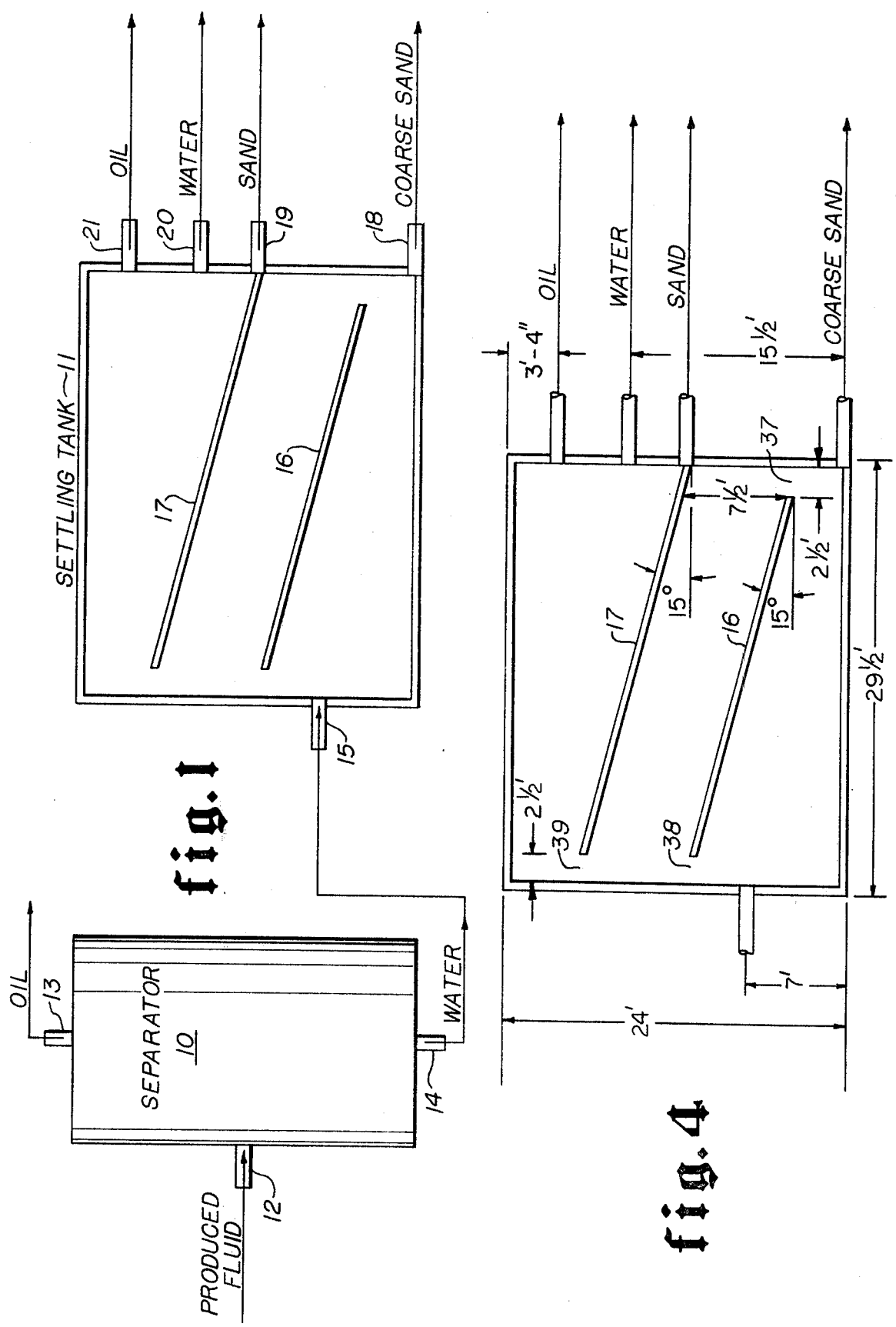
FIG. 1 is a schematic perspective view of a system for resolving water, oil, and solids from oil well production fluids.

FIG. 1 illustrates a schematic view of an oil field water producing system including a conventional separator 10 for separating oil and water from the produced fluid from a well (not shown) and the new settling tank 11 for receiving the water from the separator and cleaning it to meet environmental standards.

The conventional separator 10, FIG. 1, receives the produced fluid in its inlet 12, adds chemicals and/or heat to it for discharging oil from oil outlet 13 and water from water outlet 14.

The produced water from the separator 10, FIG. 1, contains some solids as sand, and oil as about 400 ppm (parts per million). This water, oil and solids-in-water influent enters inlet 15 on the rear wall of the new settling tank 11, passes under and over two declined baffles 16 and 17 therein with coarse sand or solids emerging from a bottom outlet 18 in the front wall, fine sand or solids emerging from an outlet 19 on the front wall at the level of the lower end of the upper baffle 17, clean water emerging from an outlet 20 on the front wall just over the fine sand outlet 19, and oil emerging from an outlet 21 in the settling tank well above the level of the top of the upper inclined baffle 17. The clean water contains usually not more than 150 ppm of oil, which is clean enough to dump into existing rivers or streams or to pump back into injection wells for purposes of secondary recovery.

Figure 3:
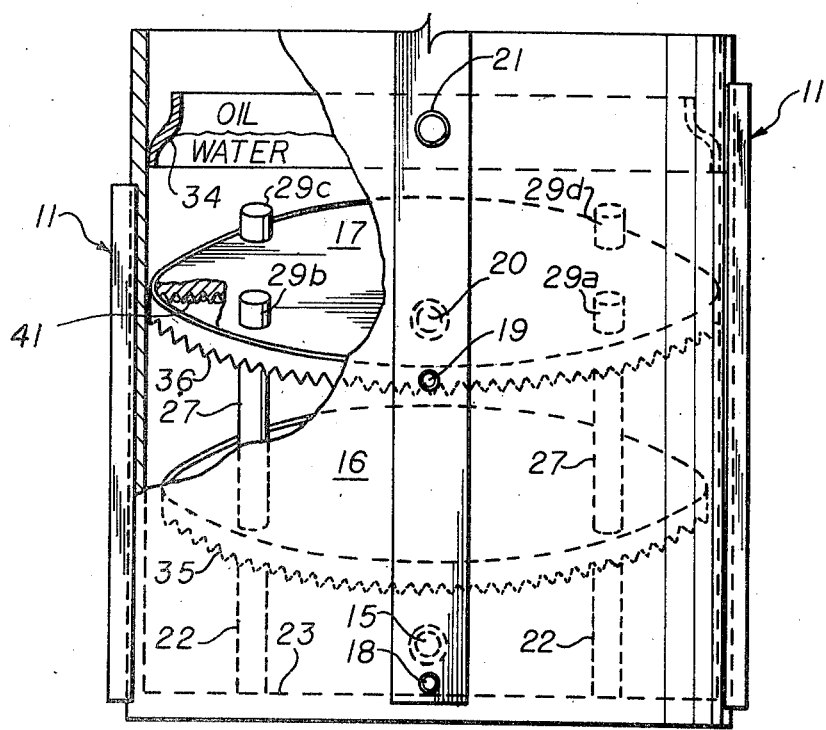
FIG. 3 is a schematic front view taken at 3—3 on FIG. 2.

FIG. 2 and 3 disclose more details of the new settling tank.

FIG. 2 illustrates a schematic side view of cylindrical settling tank 11, with parts in section, showing an inlet 15 low on the back wall for injecting an oil and solids-in-water influent and an outlet 20 positioned slightly above the solids outlet 19 in the front wall for ejection and delivery of an oil and solids-free water effluent.

Two cylindrical baffles 16 and 17, FIG. 2, are both mounted parallel to each other and both declined forwardly in the tank 11. Two front short legs 22b, 22a, FIG. 3, are secured to the tank bottom 23 and extend up with a threaded stud 24b, FIG. 2, 24a (not shown) thereon extending up through the front portion of the lower baffle 16 with shoulders supporting the lower baffle front portion. Longer rear legs 25c, 25d (not shown) extend up from the tank bottom 23 to support the higher rear portion of the forwardly declined lower baffle 16. Studs 26c, FIG. 2, 26d (not shown) protrude through the rear higher portion of the low baffle 16 to maintain the low baffle fixedly secured at the predetermined angle of forward declination.

Upper baffle 17, FIG. 2, is supported on the shoulders of four equal length spacers 27a, 27b, 27c, and 27d (27a and 27d not shown on FIG. 2) which are each screwed onto the four studs 24a, 24b, 24c, and 24d, respectively. Four threaded studs 28a, 28b, 28c, and 28d are formed on the four respective spacers 27a–27d, each have a cap, 29a–29d, thereon for maintaining the upper cylindrical baffle in its predetermined angle of forward declination relative to the horizon and accordingly parallel to the lower cylindrical baffle. The two baffles 16 and 17 from the lower chamber, intermediate chamber, and upper chamber in the tank 11.

The periphery of the lower cylindrical baffle 16 is spaced a predetermined distance from the internal tank wall surface which forms an opening 38 in the upper end of the lower declined baffle for permitting the upward flow of the separated oil from the lower compartment to the intermediate compartment. However, the forward and lower half of the upper cylindrical baffle 17 is fixedly secured to the forward cylindrical wall of the tank 11 with the back portion of the baffle 17 spaced from the tank back cylindrical wall for forming an opening 39 in the upper end of the upper declined baffle for upward flow of the separated oil to the water surface in the upper compartment. The above described spacing and contact of the baffles with the tank walls is necessary for guiding the flow of the oil and solids-inwater influent under the lower baffle from the rear to the front of the tank as viewed in FIGS. 1, 2, and 4 from left to right, up through the port or opening 37 between the lower baffle front edge and the tank front cylindrical wall, and back to the rear of the tank between the two baffles to rise through port or opening 39 between the rear peripheral edge of the upper baffle and the tank rear cylindrical wall.

Important features of this settling tank are the two solids discharge outlets 18 and 19, FIG. 2, each having a valve 30 and 31, respectively. Interconnecting duct 32 between outlets 18 and 19 discharge the solids from upper otlet 19 to join with that from lower outlet 18 to discharge solids from solids discharge duct 33. This is discharged either on a regular basis or only intermittently when required.

With effluents having few solids, and which solids when flowing under and over the lower baffle 16 settle to the tank bottom 23, and which solids from the flow over the upper baffle 17 settle thereon, solids discharge outlets 18 and 19 are now always required.

FIG. 2 illustrates the principal feature of the disclosed settling tank. The outlet 20 for clean water is positioned in the tank cylindrical front wall portion spaced just above the front low end of the upper baffle 17 and its solid discharge outlet 19, and below the horizontal plane of the upper rear end of the upper baffle which ensures that all oil on the surface will be drawn out from the oil outlet 21 and that all solids will flow off the tank bottom and off the top of the upper baffle through solids outlets 18 and 19, respectively. A weir 34 is secured near the upper periphery of the tank for catching the oil in a trough therebehind. One or more outlets 21 drains the oil from the trough to a suitable oil supply tank. The water level may be maintained at a predetermined level by discharge valves 30 and 31 in order to discharge only oil over the weir.

FIG. 3 illustrates another principal feature of the disclosed invention comprising longitudinally extending parallel V-shaped grooves 35, 36, formed in the under surface of both lower and upper baffles, respectively. The grooves extend fore and aft, parallel to a vertical plane through the inlet and outlet, 15 and 20, respectively, and parallel to the direction of forward inclination of the parallel baffles. Thus as the oil and solids-in-water influent passes under the lower baffle 16, FIG. 2, the oil that rises to the grooved bottom 35 of the lower baffle is guided to the rear of the tank where it rises between the rear edge of the lower baffle and the tank circular wall forming opening 38 and up between the rear edge of the upper baffle and the tank wall forming opening 39 to rise to the surface for discharge from outlet 21. Likewise, as the oil and solids-in-water influent passes up and around the forward edge of the lower baffle 16, and back under the upper baffle 17, the grooves in the under surface thereof guide the oil that has separated and risen to the grooves to rise in the grooves 36 to the edge of the upper baffle and the tank circular wall to the water surface above for discharge over the weir and out of the oil outlet 21. Accordingly, the droplets of oil are entrapped in the grooves regardless of the direction of the whirling currents of oil and solids-in-water. Thus, the droplets of oil are coalesced as they are guided to the rear to form larger globs 41 of oil which in turn channel more easily to the surface up between the baffle and the tank rear wall for passing over the weir and out the oil drain outlet.

The baffles have been proven to be very effective in the new settling tank. The disclosed settling tank was placed beside a similar settling tank of the same size but with no baffles. The non-baffled settling tank removed 53 percent of the oil from an oil-in-water mixture while the new baffled settling tank separated 67 percent of the oil from the mixture, an improvement of over 26 percent.

Flat spaces between vertical angle irons as utilized in the cleaning of gasoline in U.S. Pat. No. 1,869,758 obviously will not coalesce any droplets of oil if used for the different purpose of separating oil from water. The grooves must be V-shaped.

Accordingly, it will be seen that the disclosed method of resolving a mixture of oil, solids, and water will operate in a manner which meets each of the objects set forth hereinbefore.

While only one method of resolving a mixture of the invention has been disclosed, it will be evident that various other methods are possible in the arrangement and construction of the disclosed method and settling tank without departing from the scope of the invention and it is accordingly desired to comprehend within the purview of this invention such methods and modifications as may be considered to fall within the scope of the appended claims.

We claim:

1. A method for resolving a mixture of oil, water, and solids comprising,
    (a) injecting the mixture of oil, solids, and water into the lower back side of a tank,
    (b) flowing the mixture under a lower baffle declined forwardly for coalescing drops of oil that have separated from the mixture into larger globs under the declined baffle for flowing rearwardly under the baffle,
    (c) flowing the mixture up through an opening in the lower end of the lower declined baffle and then back rearwardly under an upper forwardly declined baffle, which vertically arranged baffles form lower, intermediate, and upper compartments,
    (d) collecting the solids on the bottom of the tank that have settled out of the mixture as it flows under and over the lower baffle,
    (e) flowing the mixture up through an opening in the upper end of the upper baffle and then forwardly over the upper forwardly declined baffle,
    (f) collecting the solids on the upper baffle as the mixture flows over the upper baffle,
    (g) drawing off the solids at the lower end of the upper baffle,
    (h) drawing off the oil from a surface outlet that has coalesced as water-free and solids-free oil, and
    (i) drawing off clean water from between the upper solids outlet and the oil outlet as oil-free and solids-free water.

2. A method as recited in claim 1 wherein the second method step comprises further,
    (a) flowing and guiding the oil droplets that have separated from the mixture in the lower compartments rearwardly and upwardly in V-shaped grooves in the under surface of the lower declined baffle for the full length of the baffle to coalesce into larger globs of oil for passing upwardly from the lower compartment to the intermediate compartment.

3. A method as recited in claim 1 wherein the first method step comprises further,
 (a) passing the solids that have settled on the lower declined baffle down the baffle, through the opening in the lower end thereof, and down into the lower compartment for being flushed out.

4. A method as recited in claim 3 wherein the first method step comprises further,
 (a) intermittently flushing out the solids that have passed down from the intermediate compartment with the solids that have settled in the lower compartment out of the tank on the level with the tank bottom.

5. A method as recited in claim 1 wherein the third method step comprises further,
 (a) flowing and guiding the oil droplets that have separated from the mixture in the intermediate compartment rearwardly and upwardly in V-shaped grooves in the under surface of the upper declined baffle for the full length of the baffle to coalesce into larger globs of oil for passing upwardly from the intermediate compartment to the upper compartment surface for draw off as water-free and solids-free oil.

6. A method for resolving a mixture of oil, water, and solids comprising,
 (a) injecting the mixture of oil, solids, and water into the lower back side of a tank,
 (b) flowing the mixture forwardly under the lower of two vertically spaced apart baffles, both baffles being declined toward the front of the tank for forming lower, intermediate, and upper compartments,
 (c) flowing the mixture rearwardly under the upper baffle in the intermediate compartment and forwardly over the upper baffle in the upper compartment for allowing the solids to settle out and allowing the oil to separate and rise to the surface,
 (d) discharging solids from an outlet at the lower end of the upper baffle,
 (e) discharging solids-free and oil-free water from the upper compartment through a water outlet above the upper solids outlet, and
 (f) discharging solids-free and water-free oil from the upper compartment through an oil outlet above both the water outlet and the solids outlet.

7. A method as recited in claim 6 wherein the steps of flowing the mixture under the lower and upper declined baffles comprises further,
 (a) flowing the mixture under the lower and upper declined baffles in longitudinal V-shaped grooves for the full length of the baffles for guiding the droplets of oil that have separated from the mixture rearwardly and upwardly as the oil flows in the grooves, and
 (b) coalescing the droplets of oil into larger globs of oil by flowing the oil in the V-shaped grooves for the full length of the baffles and guiding the globs to the surface for being discharged from the oil outlet as solids-free and water-free oil and thus causing the water outlet to produce oil-free and solids-free water.

8. A method as recited in claim 6 wherein the second method step comprises further,
 (a) flowing the mixture from the lower compartment up through an opening in the lower front end of the lower declined baffle for flowing rearwardly in the intermediate compartment.

9. A method as recited in claim 8 wherein the method step comprises further,
 (a) flowing the solids that have settled on the lower declined baffle down through the opening in the lower front end of the lower declined baffle to the lower compartment.

10. A method as recited in claim 7 wherein the first method step comprises further,
 (a) flowing the coalesced globs of oil in the V-shaped grooves of the lower declined baffle for the full length of the baffle under side and then up through an opening in the upper rear end of the lower declined baffle to the intermediate chamber.

11. A method as recited in claim 7 wherein the first method step comprises further,
 (a) flowing the coalesced globs of oil in the V-shaped grooves of the upper declined baffle for the full length of the baffle under side and along with the coalesced globs of oil from the intermediate chamber up through an opening in the upper rear end of the upper declined baffle to the surface of the upper compartment for discharge as solids-free and water free oil.

12. A method as recited in claim 6 wherein the fourth method step comprises further,
 (a) flowing the mixture from the intermediate compartment up through an opening in the upper rear end of the upper declined baffle for flowing forwardly in the upper compartment for allowing the solids to settle out and the oil to separate and rise to the surface for providing oil-free and solids-free water and solids-free and water-free oil.

* * * * *